April 30, 1968 — R. E. WILLIAMS ET AL — 3,380,801

SEPARATION OF COBALT FROM NICKEL

Filed July 8, 1966

INVENTORS.
ROBERT E. WILLIAMS,
JACK H. BAYLESS,
BY
ATTORNEY.

United States Patent Office 3,380,801
Patented Apr. 30, 1968

3,380,801
SEPARATION OF COBALT FROM NICKEL
Robert E. Williams and Jack H. Bayless, Houston, Tex., assignors to Esso Production Research Company
Continuation-in-part of application Ser. No. 267,009, Mar. 21, 1963. This application July 8, 1966, Ser. No. 563,762
9 Claims. (Cl. 23—50)

ABSTRACT OF THE DISCLOSURE

Nickel and cobalt are quantitatively separated and recovered from ammoniacal solutions having a pH above 8.6 and an ammonia:metal molar ratio within the range from about 2:1 to about 10:1, preferably 3:1 to 7:1, by extracting the ammoniacal solution with a hydrocarbon solution of a $C_8$ to $C_{38}$ naphthenic acid to form a cobalt salt of the naphthenic acid in an extract phase which is separated from the raffinate phase, the two phases being separately recovered with the extract phase being acidified to recover the cobalt and regenerate the naphthenic acid.

---

Figure 1:
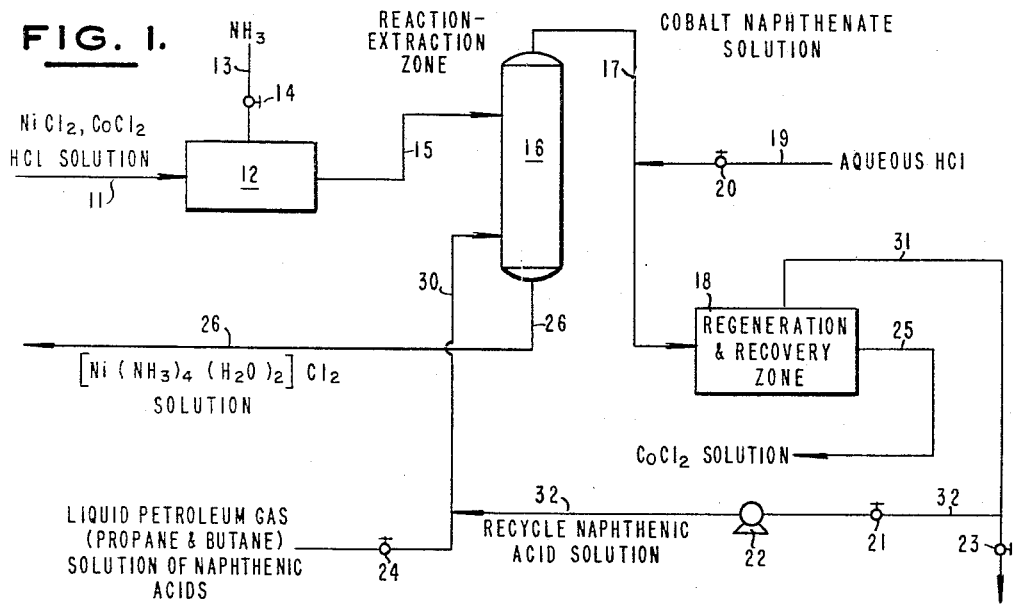

This application is a continuation-in-part of Ser. No. 267,009, entitled, "Separation of Cobalt from Nickel," filed Mar. 21, 1963, for Robert E. Williams and Jack H. Bayless.

The present invention is directed to separation of cobalt and nickel from each other. More particularly, the invention is concerned with recovering cobalt and nickel from ammoniacal solutions containing cobalt and nickel. In its more specific aspects, the invention is directed to recovering cobalt and nickel from ammoniacal solutions by a reaction-extraction operation.

The present invention may be briefly described as a method for separating nickel and cobalt which involves the formation of an ammoniacal solution of nickel and cobalt having an ammonia-metal ratio within the range from about 2:1 to about 10:1, preferably 3:1 to 7:1, and containing an ammonium salt in sufficient quantity to prevent precipitation of the metal values, followed by contacting the ammoniacal solution in a reaction-extraction zone with a hydrocarbon solution of a carboxylic acid to form a hydrocarbon extract phase and an aqueous raffinate phase containing the nickel and ammoniacal solution. The ammonium salt: cobalt ratio must be greater than about 8:1. The ratio may be as great as desired, but should not be below about 8:1 to avoid precipitation of cobalt. The cobalt, as the salt of the carboxylic acid, is in the extract phase and the extract phase may then be treated with a mineral acid to convert the carboxylic acid salt to a cobalt salt of the mineral acid and to regenerate the carboxylic acid for reuse in the operation.

The carboxylic acids finding use in the present invention are specifically the naphthenic acids such as petroleum naphthenic acids which may have an acid number of about 32 to about 250. The naphthenic acids may have a general formula of $C_nH_{2n-2}O_2$ or $C_nH_{2n-4}O_2$ where $n$ has a value between 8 and 25. Other carboxylic acids such as the saturated and unsaturated fatty acids from $C_8$ to $C_{38}$ or mixtures thereof, and the like acids may be used. Specific carboxylic acids finding usage in the present invention are caprylic, capric, lauric, myristic, palmitic, stearic, ricinoleic, arachidic, lignoceric, oleic, linoleic, and the like acids. Suitable fatty or carboxylic acids finding use in the present invention are described in "Fatty Acids" by Klare S. Markley, Interscience Publishers, Inc., New York, 1947, which acids are incorporated herein by reference.

The hydrocarbons in which the carboxylic acid solution is formed may include petroleum hydrocarbons boiling up to about 800° F. Liquefied petroleum gas, such as mixtures of butane and propane and the like, may also be employed. Petroleum hydrocarbons in the gasoline, kerosene, and gas oil boiling range may be used. Pure hydrocarbons or mixtures thereof such as pentane, hexane, heptane, octane, nonane, decane, and cetane may also be used. The aromatic hydrocarbons such as benzene, toluene, xylene, ethylbenzene, mesitylene, cumene, durene, and the higher members of the homologous series may also be employed. As a general statement, the hydrocarbons may include paraffins, olefins, naphthenes, and aromatics boiling up to about 800° F.

Temperatures employed in the present invention may vary from about 30° F. up to about 200° F. A preferred temperature may range from about 60° F. to about 120° F.

Pressures employed in the present invention are sufficient to maintain liquid phase operations.

The ratio of hydrocarbon solution to ammoniacal solution may range from about 5:1 to about 1:5 with good results being obtained at ratios of about 2:1 to about 1:2. Good results are obtained at a 1:1 ratio of hydrocarbon solution to ammoniacal solution.

The amount of ammonia in the ammoniacal solution must be sufficient to provide an ammonia concentration at least about twice the metal concentration below which ratio nickel and cobalt are not separable, whereas above about 2 to 1 mol ratio, cobalt and nickel are separable in accordance with the present invention. In all of the above solutions, the concentration of ammonium salt must be sufficient to prevent precipitation of the metal values. Also, it is desirable that the pH of the ammoniacal solution be above 8.6. Above a pH of 8.6, nickel is not extracted but cobalt is extracted. The ammonia-metal molar ratio of the solution should be above about 2:1 and preferably within the range of about 2:1 to about 10:1 to form a nickel-ammonia complex which is not extracted by the hydrocarbon solution of the fatty acid. A preferred range of the ammonia-metal molar ratio is within the range of 3:1 to 7:1. It is to be understood that the ammonia-nickel molar ratio is within the range of about 2:1 to about 10:1 and the ammonia-cobalt molar ratio is also within this range. Thus, where the term ammonia:metal ratio is used, this term means ammonia:nickel or ammonia:cobalt or both.

The amount of carboxylic or fatty acids dissolved in the hydrocarbon solution will depend on the solubility characteristics of the particular carboxylic or fatty acid and the hydrocarbon employed.

Generally, the amount of carboxylic or fatty acid in solution may range from about 0.1% to about 10% by volume of the solution. Most of the carboxylic or fatty acids are extremely soluble in hydrocarbon solvents, especially at elevated temperatures. It is possible that as high as 70% to 80% of the volume of hydrocarbon phase may be acid. While ordinarily this high concentration of acid may not be used, it may be desirable in some instances to do so. The preferred amount of carboxylic acid in the hydrocarbon solution is that quantity which reacts with all of the cobalt in the aqueous ammoniacal solution. Thus, knowing the amount of cobalt allows determination of the amount of carboxylic acid. It is customary to assay the material to be refined.

The amount of nickel and cobalt in the ammoniacal solution may range from about less than 1% of each of these metals in the ammoniacal solutions up to saturated solutions.

The nickel and cobalt may be employed as the chlorides, sulfates, nitrates, acetates, and the like salts in the ammoniacal solution.

The acid employed in regenerating the naphthenic acid and recovering the cobalt may include aqueous mineral and other strong acids such as hydrochloric acid, sulfuric acid, acetic acid, nitric, or any other acidic material, and the like, having an acid dissociation constant greater than that of the carboxylic acid used. Acidic salts could be used to provide the necessary acidity, for example:

$$AlCl_3 + 3H_2O \rightleftharpoons H_3AlO_3 + 3HCl$$

The cobalt may be recovered from its aqueous solutions by well-known means such as described in "A Comprehensive Treatise on Inorganic and Theoretical Chemistry," by J. W. Mellor, vol. XIV, Fe (part 3) Co, pp. 440–444, Longmans, Green and Co., New York, 1935; and by Schall, Murphy and Lurich in Liddell's "Handbook of Nonferrous Metallurgy," vol. II, pp. 583–592 (1945).

Figure 2:
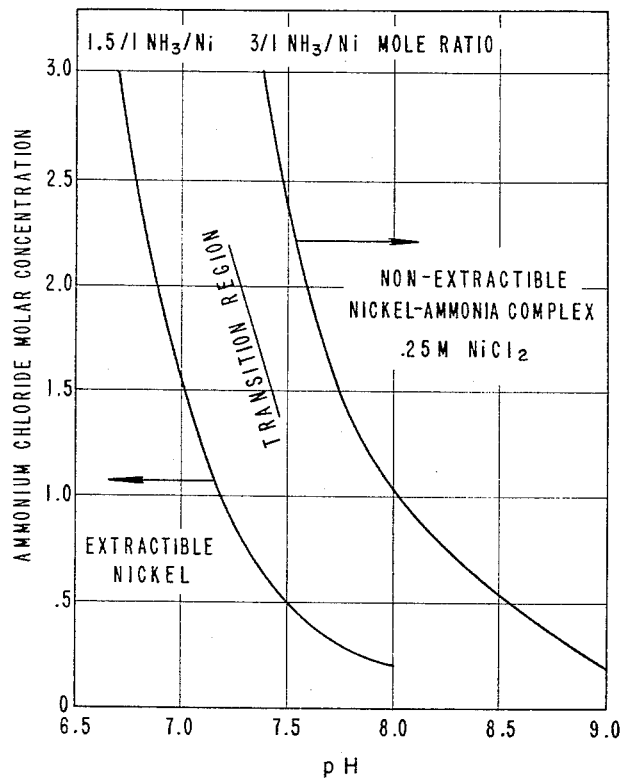

The present invention will be further illustrated by reference to the drawing in which FIGURE 1 is a flow diagram of a preferred mode; and FIGURE 2 is a plot of data illustrating the effect of pH and the molar ratio of ammonia to nickel on extraction of nickel from solutions containing sufficient ammonium chloride to prevent precipitation of the nickel values.

Referring to the drawing and particularly to FIGURE 1, numeral 11 designates a charge line by way of which a hydrochloric acid solution of nickel and cobalt chloride is introduced into a vessel 12 into which ammonia is introduced by way of line 13, controlled by valve 14. The solution is converted into a nickel and cobalt ammoniacal chloride aqueous solution. This solution is then charged by way of line 15 into a reaction-extraction zone 16 which suitably may be a countercurrent or co-current contacting tower equipped with suitable internal liquid-liquid contacting means such as bell cap trays, Raschig rings, packing, and the like. Introduced into the bottom of zone 16 by way of line 30 is a hydrocarbon solution of carboxylic acids such as a solution of naphthenic acids in liquefied petroleum gas, pentane, and the like. The ammoniacal solution and the hydrocarbon solution flow countercurrently or cocurrently to each other and intimately contact each other such that the cobalt is converted to the naphthenate in solution in the hydrocarbon; whereas, the nickel does not react and is not extracted. The hydrocarbon extract phase, having cobalt naphthenate or the like fatty acid salt in solution, is withdrawn by way of line 17 and flows thereby into a regeneration and recovery zone 18. An aqueous acid solution such as hydrochloric acid is introduced into line 17 by way of line 19, controlled by valve 20, with the hydrochloric acid reacting with the cobalt naphthenate to regenerate the naphtenic acid and form cobalt chloride. The cobalt chloride and naphthenic acid solution are separated in zone 18 and the hydrocarbon solution of naphthenic acid is withdrawn by line 31 and may be recycled, at least in part, by way of line 32, controlled by valve 21, containing a pump 22 to line 30. If desired, a portion of the hydrocarbon solution may be discharged by opening valve 23 and another portion of fresh hydrocarbon solution introduced by line 30 by opening valve 24.

The cobalt chloride is withdrawn as an aqueous solution by way of line 25 for further treatment for recovery of the cobalt chloride. The nickel ammonium chloride solution is withdrawn from zone 16 by way of line 26 for recovery of the nickel therefrom. Suitable methods for recovery of the cobalt and the nickel from the solutions include electrolytic plating, conversion to the oxide and reduction of same. (It may be desirable to keep the cobalt as cobalt chloride in which form it is often sold; to do this, simply evaporate the solvent.)

It will be clear from the foregoing description taken with the drawing that a simple continuous operation is provided by way of which cobalt and nickel are separated from each other by a reaction-extraction technique with a hydrocarbon.

The present invention is based on the discovery that nickel and cobalt form water soluble amine complexes, the dissociation constants of which are such that when the aqueous ammoniacal solution of cobalt and nickel is contacted with a solution of a high molecular weight carboxylic acid, such as naphthenic acid and the like dissolved in a hydrocarbon as illustrated, the cobalt will form the naphthenate and is extracted into the hydrocarbon phase. The formation of a deep blue color in the ammoniacal solution containing ammonium salts indicates formation of the nickel complex which is not extractable. The nickel complex does not form the naphthenate and, hence, is not extracted and remains in the aqueous phase. The separation is quantitative and quite rapid. Thus, the present invention allows this reaction-extraction operation to be performed in countercurrent or cocurrent liquid-liquid extraction equipment.

The hydrocarbon phase containing pure cobalt naphthenate is then contacted with an aqueous solution of a mineral acid such as hydrochloric or sulfuric acid which liberates the carboxylic acid which remains in the hydrocarbon phase for reuse in the reaction-extraction operation. The aqueous phase simultaneously extracts the cobalt as the chloride or sulfate and allows recovery of the cobalt.

The invention will be further illustrated by the following examples which set forth the best mode contemplated by the inventors in carrying out the invention.

EXAMPLE I

A 4 molar solution of ammonium chloride, 1 molar ammonium hydroxide and 0.2 molar cobalt nitrate hexahydrate having a pH of about 8.2 and an ammonia:cobalt ratio of 5:1 was made up and found to be a clear solution of a deep grape color. This solution was extracted with a solution of 1% by volume of oleic acid in kerosene. The aqueous phase became clear and the kerosene phase became deeply colored with the cobalt oleate.

EXAMPLE II

A similar solution of nickel containing 4.0 molar ammonium chloride, 1.0 molar ammonium hydroxide, 0.2 molar nickel chloride, and having a pH of about 8.2 and an ammonia:nickel ratio of 5:1 was extracted with the oleic acid-kerosene solution. There was no change of color in the aqueous phase and the oil solution also remained clear. This shows that the nickel was not reacted or extracted.

EXAMPLE III

An ammoniacal solution of both cobalt and nickel of the same concentration of 0.1 molar each and containing 4.0 molar ammonium chloride and 1.0 molar ammonium hydroxide and having a pH of about 8.2 and an ammonia-metal ratio of 5:1 (both cobalt and nickel) was also extracted with the 1% oleic acid in kerosene solution. This caused the aqueous phase to assume the color of the solution containing the nickel only. The oleic acid-oil phase became colored with cobalt oleate.

EXAMPLE IV

In order to determine the conditions necessary for extraction of cobalt from ammonium chloride-ammonia solutions by hydrocarbon solutions of fatty or organic acids, 20 solutions were made up containing 0.025 molar $CoCl_2$ where the ammonia concentrations ranged from 0.1 molar to 0.5 molar and the ammonium chloride concentrations ranged from 0.2 molar to 2.5 molar. All of these solutions except the one having the lowest concentration of $NH_4OH$ and $NH_4Cl$ were clear (no precipitate) and were rose to brown in color. Thus, the ammonium salt:cobalt ratio must be greater than 8:1 to prevent precipitation of the cobalt values. Since nickel is not as easily precipitated from ammoniacal solution, the nickel values will remain in solution under all conditions that cobalt will remain in solution. The aqueous solutions were extracted with a hydrocarbon (pentane) solution of 1% by volume oleic acid solution with a volume ratio of 2:1 (hydrocarbon phase to aqueous phase). The cobalt was extracted in the oil phase as noted by color changes in the phases. Complete extraction of cobalt was obatined where the lower concentrations of ammonia and ammonium chloride was present in the solution. From these data, it may be concluded that cobalt will extract under a wide range of concentrations.

EXAMPLE V

Several solutions of 1 molar ammonium chloride and 0.25 molar nickel chloride were prepared. To these solutions, ammonium hydroxide was added to form solutions of ammonia in a concentration range of 0.25 molar to 0.75 molar. No precipitate was formed in any of these solutions. These solutions were then extracted with 2% by volume oleic acid in pentane solvent in a 1 to 1 volume ratio of hydrocarbon solution to aqueous solution. It was noted immediately that extraction of the nickel occurred in the solutions where the ammonia concentration was low (0.25 molar to 0.5 molar) and the colors of the aqueous phase ranged from green to blue-green. The color of the hydrocarbon solution was green. At the higher ammonia concentration, about 0.75 molar, at a molar ratio of ammonia:nickel of 3:1, nickel would not extract into the hydrocarbon phase. In this particular case, the color was a clear deep blue. This change in color from green to blue indicates the formation of a nickel-ammonia chloride complex in which the hydrated nickel ion is no longer available for reaction with the organic acid in the hydrocarbon phase.

EXAMPLE VI

To determine if cobalt would extract under conditions where nickel is not extractable, a solution of 1 molar ammonium chloride, 0.2 molar nickel chloride, 0.05 molar cobalt chloride and 0.75 molar ammonium hydroxide was prepared. This solution had an ammonia:metal molar ratio of 3:1. This solution was extracted with a 2% by volume oleic acid solution in pentane to a ratio of 1 to 1. It was noted immediately that the oil phase picked up a deep rose to violet color characteristic of the cobalt color noted in previous extractions, whereas the color of the aqueous phase remained unchanged in color and was deep blue characteristic of the nickel complex noted in the foregoing examples. These data show that the cobalt was extracted into the oil phase leaving the aqueous phase with nickel unextracted.

These examples show that the cobalt is selectively reacted and extracted from ammoniacal solutions containing cobalt and nickel.

Referring now to FIGURE 2, which shows the effect of pH on extraction of nickel and also the effect of controlling the molar ratio of ammonia:nickel on extraction of nickel, it will be clear that at a molar ratio of ammonia to nickel of 1.5:1, the nickel is extractable with a hydrocarbon solution of a fatty or carboxylic acid whereas at the molar ratio of ammonia to nickel of 3:1, a non-extractable deep blue nickel-ammonia complex is formed. Between a molar ratio of 1.5:1 and 3:1, there is a transition region of greenish to blue solutions where the nickel is less and less non-extractable with the cobalt.

Hence, it is preferred to maintain the molar ratio above about 2:1 and preferably about 3:1 or above for best results. Of particular interest is the fact that pH has little effect on the degree of extraction, the critical condition being the ratio of ammonia:metal.

Heretofore, the separation of cobalt from its mixtures with iron, nickel and arsenic has resolved itself into separation of cobalt from nickel, which has been quite difficult. Many methods of separation have been proposed but none allows the obtaining of a quantitative separation by a reaction-extraction technique, such as as the present invention. The present invention is quite useful in recovering cobalt and nickel from cobaltous and nickelous ores containing cobalt and iron such as found in Cuba and elsewhere. In short, in the present invention, an ammoniacal solution is formed having an ammonia:metal (cobalt and nickel) ratio above about 2:1 and sufficient ammonium salt to prevent precipitation of cobalt and then the cobalt is selectively reacted and extracted from the ammoniacal solution with a hydrocarbon solution of a carboxylic acid. The present invention is quite useful and important and has many advantages over the prior art processes.

The nature and objects of the present invention having been completely described and illustrated, and the best mode contemplated set forth, what we wish to claim as new and useful and secure by Letters Patent is:

We claim:

1. A method of quantiatively separating nickel and cobalt from ammoniacal solutions having a pH above 8.6 containing nickel and cobalt having an ammonia:metal molar ratio within the range from about 2:1 to about 10:1 and containing sufficient ammonium salt to prevent precipitation of metal values and provide a ratio of ammonium salt:cobalt greater than about 8:1 which comprises contacting said said ammoniacal solution with a hydrocarbon solution of a $C_8$ to $C_{38}$ naphthenic acid having an acid number of about 32 to about 250 at a temperature from about 30° F. to about 200° F. to form an extract phase containing cobalt salt of said fatty acid and a raffinate phase containing the nickel in ammoniacal solution, and separating said phases, said hydrocarbon being selected from the group consisting of paraffins, olefins, naphthenes, and aromatics boiling up to about 800° F., and the ratio of hydrocarbon solution to ammoniacal solution ranging from about 5:1 to about 1:5.

2. A method in accordance with claim 1 in which the hydrocarbon is liquefied petroleum gas.

3. A method in accordance with claim 1 in which the ammonia:metal molar ratio is within the range from 3:1 to 7:1.

4. A method in accordance with claim 1 in which the hydrocarbon is a petroleum fraction.

5. A method in accordance with claim 1 in which the naphthenic acid is a petroleum naphthenic acid.

6. A method in accordance with claim 1 in which the extract phase is acidified to recover the cobalt and regenerate said naphthenic acid.

7. A method in accordance with claim 1 in which the aqueous raffinate phase is recovered.

8. A method in accordance with claim 1 in which the hydrocarbon solution contains from about 0.1% to about 10% by volume of said naphthenic acid.

9. A method in accordance with claim 1 in which:
   (a) the hydrocarbon is a petroleum fraction;
   (b) the extract phase is acidified to recover the cobalt and regenerate said naphthenic acid;
   (c) the raffinate phase is recovered;
   (d) the hyddocarbon solution contains from about 0.1% to about 10% by volume of said naphthenic acid; and
   (e) said naphthenic acid is a petroleum naphthenic acid.

(References on following page)

References Cited

UNITED STATES PATENTS

| | | | |
|---|---|---|---|
| 3,055,754 | 9/1962 | Fletcher | 75—97 |
| 3,251,646 | 5/1966 | Alon et al. | 23—50 |

OTHER REFERENCES

Fletcher et al., "Bulletin of the Institution of Mining & Metallurgy (London)," vol. 70, No. 652, March 1961, pp. 355–366.

Gindin et al. (A), "Chemical Absts.", vol. 53, 1959, p. 19823.

Gindin et al. (B), "Chemical Absts.", vol. 55, 1961, p. 2239.

Gindin et al. (C), "Chemical Absts.", vol. 57, 1962, p. 2359.

MILTON WEISSMAN, *Primary Examiner.*

HERBERT T. CARTER, OSCAR R. VERTIZ, *Examiners.*